United States Patent
Ochoa et al.

(10) Patent No.: US 10,303,841 B1
(45) Date of Patent: May 28, 2019

(54) AUTOMATIC PEAK INTERVAL, RELATIVE VOLATILITY, AND RELATIVE AMPLITUDE DETECTION IN HIGH-VOLUME TEMPORAL DATA

(71) Applicant: National Technology & Engineering Solutions of Sandia, LLC, Albuquerque, NM (US)

(72) Inventors: Edward M. Ochoa, Powder Springs, GA (US); Kristina Rodriguez Czuchlewski, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 330 days.

(21) Appl. No.: 15/077,584

(22) Filed: Mar. 22, 2016

Related U.S. Application Data

(60) Provisional application No. 62/138,912, filed on Mar. 26, 2015.

(51) Int. Cl.
  *G06F 17/40* (2006.01)
  *G06F 17/50* (2006.01)

(52) U.S. Cl.
  CPC ................... *G06F 17/509* (2013.01)

(58) Field of Classification Search
  CPC ............ G06T 7/0012; G06T 5/20; G06T 2207/30068; G06T 2207/20084; G06T 2207/10116; G06T 2207/20081; G06T 7/11; G06T 7/136; G06T 7/155; G06T 7/187; G06T 7/42; G06K 9/38; G06K 2209/05; G06K 9/4609; G06K 9/6254; G06K 9/3233; G06K 9/622; Y10S 128/922; A61B 6/502; B25J 15/04
  See application file for complete search history.

(56) References Cited

U.S. PATENT DOCUMENTS

| | | |
|---|---|---|
| 6,263,290 B1 | 7/2001 | Williams et al. |
| 6,745,150 B1 | 6/2004 | Breiman |
| 7,864,389 B2 | 1/2011 | Shan |
| 9,069,819 B1 | 6/2015 | Kumar et al. |

*Primary Examiner* — Robert G Bachner
(74) *Attorney, Agent, or Firm* — Medley, Behrens & Lewis, LLC

(57) ABSTRACT

Various technologies pertaining to automatic relative volatility and relative amplitude detection are described herein. A spectral density of a geospatial temporal dataset is computed, and one or more frequencies of the dataset are identified. A volatility period of interest is calculated based upon the frequencies, and volatility thresholds are computed based upon the volatility period of interest. One or more periods of potential interest are detected in the dataset based upon the geospatial temporal data and the volatility thresholds. An indication of the periods of interest, an occurrence of an event captured in the dataset, or a prediction of an occurrence of an event that is of potential interest to an analyst is output.

16 Claims, 5 Drawing Sheets

AUTOMATIC PEAK INTERVAL, RELATIVE VOLATILITY, AND RELATIVE AMPLITUDE DETECTION IN HIGH-VOLUME TEMPORAL DATA

RELATED APPLICATION

This application claims priority to U.S. Provisional Patent Application No. 62/138,912, filed Mar. 26, 2015, and entitled "AUTOMATIC PEAK INTERVAL, RELATIVE VOLATILITY, AND RELATIVE AMPLITUDE DETECTION IN HIGH TEMPORAL DATA", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Various systems exist to create and store geospatial data. For example, satellites orbiting earth can be equipped with cameras that capture images of the earth. In another example, high-resolution cameras can be coupled to aircraft (drones and/or manned aircraft), and images captured by these high-resolution cameras can be assigned geographic data. Moreover, synthetic aperture radar (SAR) technologies can be utilized in connection with generating geospatial data. If a region is monitored over time, geospatial temporal data can be generated. Conventionally, however, there is a lack of suitable technologies for analyzing such data (and similar types of temporal data).

Volatility measures are used in some industries to allow analysts to identify outlier conditions in time-series data. Certain volatility measures have been used to trigger a responsive action (where the action is undertaken when some feature of the time-series data exceeds or falls beneath a threshold). These threshold values can be calculated in part based upon rules of thumb that define values of various volatility measure parameters, such as a period for calculating a moving average of pricing data for the asset and a number of standard deviations away from the moving average the threshold should be. These rules of thumb are generally data-independent, and may place arbitrary constraints on the volatility analysis problem.

SUMMARY

The following is a brief summary of subject matter that is described in greater detail herein. This summary is not intended to be limiting as to the scope of the claims.

Various technologies for automatic detection of relative volatility and relative amplitude of geospatial temporal data using dataset-specific analysis parameters are described herein. Geospatial or time-tagged data, such as, for example, a series of images of a scene captured over time, is generated at a geospatial sensor, and such sensor data can be retained in computer-readable storage for subsequent analysis. Features of interest are extracted from the geospatial sensor data and are quantized to generate a geospatial temporal dataset comprising numerical values of the features of interest over a period of time (e.g., a number of cars in a parking lot over a period of several weeks). A spectral density of the set of feature values is computed and a volatility period calculated based upon one or more frequencies observed in the dataset. A volatility threshold comprising a plurality of values is then computed based upon a moving average of values within the volatility period and a fixed multiple of a rolling standard deviation of the feature values. An event or occurrence of potential interest in the feature can be identified based upon the volatility threshold and the values of the features of the geospatial temporal dataset. In another example, a prediction of an event at a future time can be generated based upon the volatility threshold and the values of the features of the geospatial temporal dataset. An indication of the event, occurrence, or prediction can be output, for example to a display screen.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
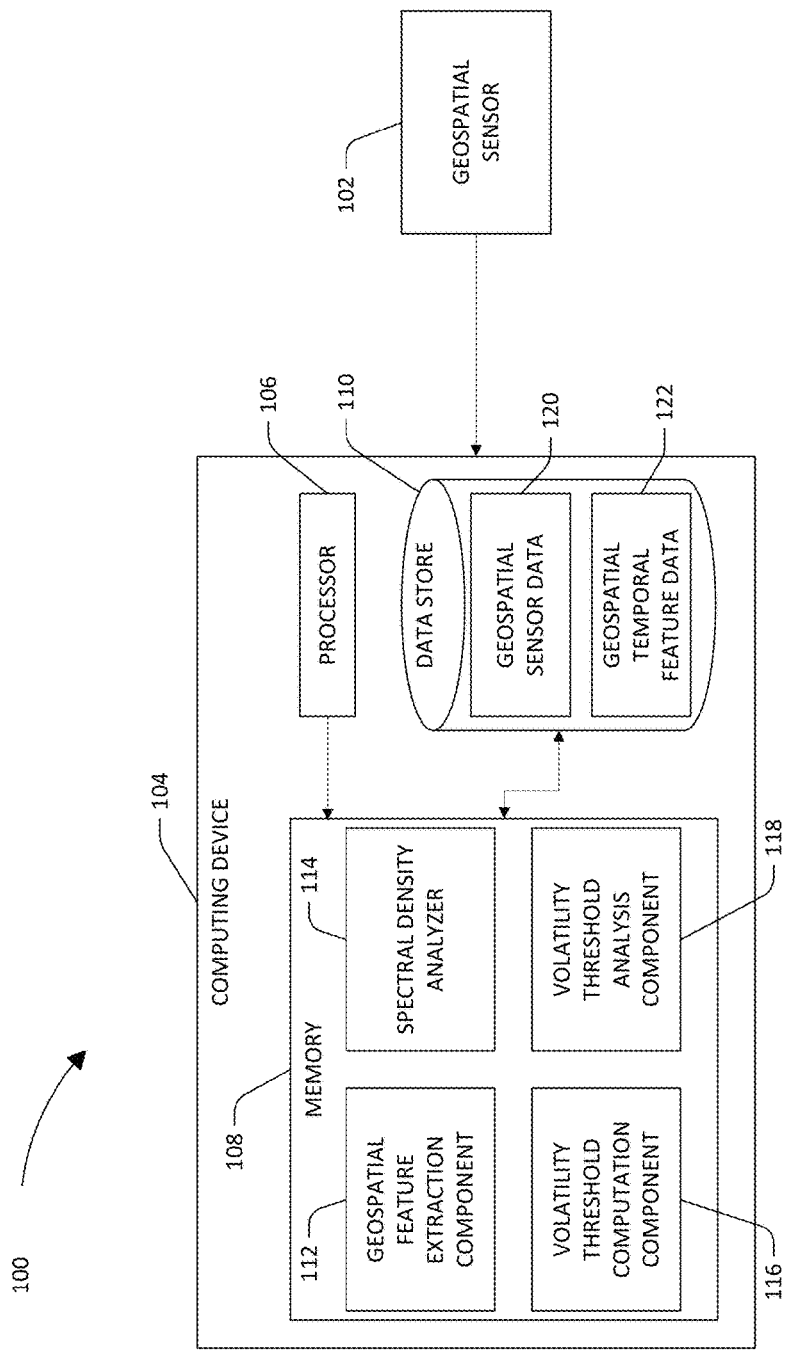
FIG. 1 is a functional block diagram of an exemplary system that facilitates detection of relative volatility and relative amplitude in geospatial temporal datasets.

Various technologies pertaining to automatic detection of relative volatility and relative amplitude of high-volume temporal datasets are now described with reference to the drawings, wherein like reference numerals are used to refer to like elements throughout. While the following description describes these technologies with reference to geospatial temporal data, it is to be understood that the methods and systems described herein are applicable to analysis of any type of data that can be represented as a time series. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates automatic detection of relative volatility and relative amplitude with respect to features of interest in high-volume geospatial temporal datasets based upon measures of relative volatility is illustrated. The system 100 includes a geospatial sensor 102 and a computing device 104. The computing device 104 comprises a processor 106, memory 108, and a data store 110. The memory 108 comprises computer-executable instructions, the instructions comprising a geospatial feature extraction component 112, a spectral density analyzer 114, a volatility threshold computation component 116, and a volatility threshold analysis component 118.

The data store 118 includes geospatial sensor data 120, which is based upon data captured and output by the geospatial sensor 102. The geospatial sensor 102 can be any sensor that generates geospatial data (e.g., a synthetic aperture radar (SAR), LiDAR, a video camera, etc.). In an example, the geospatial sensor 102 can be a SAR sensor that is mounted on an aircraft and generates data based upon observation of an area of interest overflown by the aircraft. The geospatial sensor data 120 generated by the geospatial sensor 102 can be indicative of various features of interest. Continuing the example, geospatial sensor data generated by an aircraft-mounted SAR system can be indicative of a presence of a number of vehicles in an area. In another example, the geospatial sensor data 120 can be indicative of a pattern of migration of animals through a geographic area. The geospatial sensor 102 can provide the geospatial sensor data 120 to the computing device 104 in batches, as a data stream, etc. The geospatial sensor data 120 can be stored in the data store 110 for processing at a later time. The geospatial sensor data 120 comprises data indicative of the various features of interest over some period of time. The period of time is, for example, a period of time over which the geospatial sensor 102 observes a region of activity.

As described above, the geospatial sensor data 120 can include various features of interest observed by the geospatial sensor 102 in the area of observation, and further the features of interest can be defined by an analyst. Exemplary features of interest with respect to the geospatial sensor data 120 include number of vehicles in a region, number of pedestrians in a region, etc. Further, the geospatial sensor data 120 can be temporal in nature, such that the geospatial sensor data 120 can be referred to as time-series data. It is thus to be understood that features of interest can be substantially any information that can be derived from the geospatial sensor data 120.

The geospatial feature extraction component 112 extracts the features of interest and outputs geospatial feature data that provides a quantitative measure of the one or more features. The geospatial feature extraction component 112 can, for example, use image processing techniques to analyze pixel data of a SAR image to determine a number of vehicles depicted in the SAR image. As discussed above, the geospatial sensor data 120 comprises data indicative of the features of interest over a period of time. The geospatial feature extraction component 112 can extract features from the geospatial sensor data 120 to generate geospatial temporal feature data 122 that comprises a time-series quantitative measure of the one or more features of interest over the period of time.

The spectral density analyzer 114 receives the geospatial temporal feature data 122 and determines a volatility period of interest for the dataset 122. The volatility period of interest is a period that can be used by the volatility threshold computation component 116 to compute one or more volatility threshold bands corresponding to the dataset 122, as described in greater detail below. The volatility period of interest can correspond to a frequency of change of the values of the features of interest in the geospatial temporal feature data 122. The frequency of change of the values of the features of interest can be treated similarly to a frequency of an electrical signal that is sampled at some sampling rate. With more specificity regarding determining the volatility period of interest, the spectral density analyzer 114 can be configured to perform acts comprising: 1) computing a fast Fourier transform (FFT) of the values of the data 122 to generate a frequency domain representation of the data 122; 2) identify a peak or peaks in the frequency domain representation of the data 122, where such peaks are indicative of prevalent frequencies of occurrence of the values of the feature(s) of interest in the data; and 3) identify one or more periods of interest based upon the frequencies. In a non-limiting example, the spectral density analyzer 114 can identify a peak in the frequency domain representation of the data 122, which corresponds to a first frequency f, and can further identify a first (volatility) period of interest T as being 1/f.

The FFT of the dataset 122 can have many peaks corresponding to a plurality of frequencies in the dataset 122. The spectral density analyzer 114 can be configured to select a frequency from among the plurality of frequencies based upon some criterion. The criterion can be, for example, a criterion determined by a type of feature described by the dataset 122. In another example the criterion can be a criterion selected by a user of the system 100. The criterion can cause the spectral density analyzer 114 to select, for example, a lowest frequency corresponding to a peak of the FFT. In another example, the criterion can cause the spectral density analyzer 114 to select a dominant frequency, the dominant frequency corresponding to a highest peak of the FFT. In some deployment environments, the geospatial temporal feature data 122 can be expected to have a non-zero mean value. In such a case, the FFT can have a highest value at a frequency of zero or near zero, corresponding to some mean non-zero offset value of the dataset 122. The spectral density analyzer 114 can be configured to reject low-frequency peaks corresponding to the offset value, so that the dominant frequency is not a frequency corresponding to the offset. This ensures that the computed volatility period of interest corresponds to a periodicity of the dataset 122.

Upon computing a volatility period of interest for the dataset 122, the spectral density analyzer 114 can provide the volatility period value to the volatility threshold computation component 116. The volatility threshold computation component 116 computes volatility threshold bands for the dataset 122. The volatility threshold bands provide a measure of expected or "normal" variation of values of the geospatial temporal feature data 122. The volatility threshold bands comprise values over the period of time spanned by the geospatial temporal feature data, where values of the bands at a time t can be based upon the values of the dataset in a window of time about t. The volatility threshold computation component 116 can compute an upper volatility threshold band and a lower volatility threshold band. The upper volatility threshold band can comprise values above which values of the dataset 122 can be interpreted as unusually high given the behavior of the data 122 over time, and the lower volatility threshold band can similarly comprise values below which values of the dataset 122 can be interpreted as being unusually low. It is to be understood, therefore, that the volatility threshold bands provide a context-sensitive measure that can be used to analyze volatility of the data 122 over time. For example, suppose that the geospatial temporal feature dataset 122 takes on values 3 and 5 corresponding to times $t_1$ and $t_2$, respectively. Suppose further that based upon computations performed by the volatility threshold computation component 116, an upper volatility threshold band takes values 2 and 6 at respective times $t_1$ and $t_2$. Such result can indicate to an analyst that at time $t_1$ the value of the feature described by the geospatial temporal feature data 122 is unusually high, as the dataset value of 3 is higher than the upper volatility band value of 2. At time $t_2$, however, while the dataset 122 takes on a value that is higher than the value of the dataset at time $t_1$, since the value (5) is lower than the value of the upper volatility threshold band (6), an analyst can conclude that at time $t_2$ the value of the feature described by the dataset 122 is not abnormally high relative to the behavior of the dataset 122 in a window of time about $t_2$.

The volatility threshold computation component 116 can compute values of the upper and lower volatility threshold bands based upon a moving average of the values of the geospatial temporal feature data 122 and a rolling standard deviation of the values. For example, the volatility threshold computation component 116 can calculate upper and lower volatility threshold bands according to the formula $MA \pm K\sigma$ where MA is the moving average, $\sigma$ is the rolling standard deviation, and K is a parameter value defining a number of standard deviations away from the moving average to place the threshold bands. The moving average value at a particular time is a mean average of values of the dataset 122 within a window of time. In an example, the moving average value at time $t_1$ can be a mean of all the values of the geospatial temporal feature data 122 from a time ten seconds prior to $t_1$ to a time ten seconds after $t_1$. In another example, the window of time can be prior in time to the particular time, rather than centered around the particular time. The volatility threshold computation component 116 computes the moving average and the rolling standard deviation using the volatility period of interest as the window of time. Since the volatility period of interest is derived from the FFT of the geospatial temporal feature data 122, the calculation of the volatility threshold bands is based upon properties inherent to the particular data being analyzed rather than arbitrary rules of thumb. This allows the volatility threshold computation component 116 to calculate volatility threshold bands that are not based upon constraints that may be inappropriate for the geospatial temporal feature data 122 being analyzed.

The remaining component of the volatility threshold band calculation is the value K, referring to a number of standard deviations away from the moving average that each band is to be placed. The value of K that the volatility threshold computation component 116 uses to compute the volatility threshold bands determines a channel width, which is a distance between the upper and lower volatility threshold bands. The value of K to use in the calculation of the bands can depend on an analysis objective of an analyst who is using the system 100 to assist in the analysis of the geospatial temporal feature data 122. For example, the analyst may wish to know when values of the data 122 exceed a specific number of standard deviations from the moving average. In such case, the selection of K is simply the desired number of standard deviations. In another example, the analyst may have less specific aims, and instead may only want to know for which periods the dataset 122 has its greatest relative volatility. In this example, K can be selected automatically by the volatility threshold computation component 116. The volatility threshold computation component 116 can, for example, initially select some K that is very large, so that no values of the data 122 lie outside the channel between the bands. The volatility threshold computation component 116 can then iteratively compute new volatility threshold bands, reducing K with each iteration. The iterative process can continue until the volatility threshold computation component 116 identifies that at least one value of the dataset 122 lies outside the channel formed by the upper and lower volatility threshold bands. In yet another example, the volatility threshold computation component 116 can iteratively reduce the value K until a predetermined number of values of the data 122 lie outside the channel between the bands.

The volatility threshold analysis component 118 analyzes the geospatial temporal feature data 122 and the volatility threshold bands together to identify times or periods of time where events of potential interest in the dataset 122 may have occurred, or where they are expected to occur should the dataset 122 continue in time. An event of potential interest in the data 122 can be substantially any behavior of features of interest in the data 122. In an example, the event of potential interest can be an unusually high number of cars parked in a parking lot outside an airport. The volatility threshold analysis component 118 can identify times or periods of time corresponding to events of interest through analysis of the volatility threshold bands and the values of the dataset 122.

Figure 2:
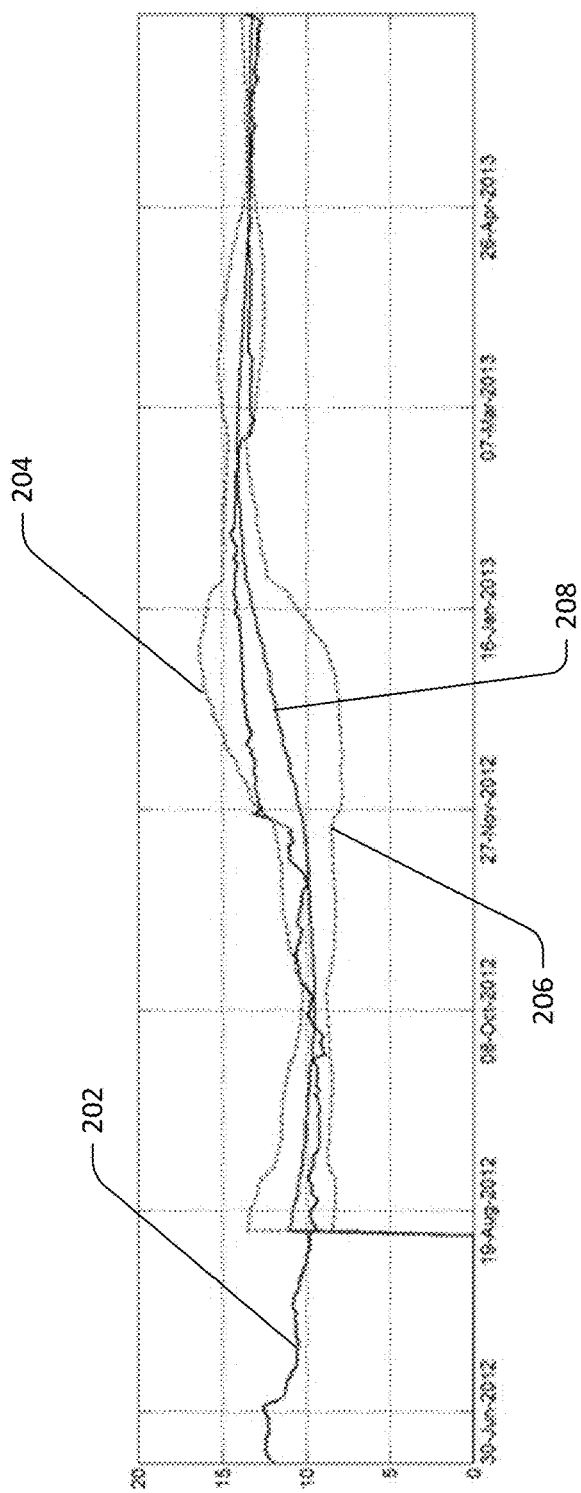
FIG. 2 is an illustration of an exemplary geospatial temporal dataset and volatility threshold bands.

Referring now to FIG. 2, an exemplary illustration of values of a geospatial temporal feature dataset 202, an upper volatility threshold band 204, a lower volatility threshold band 206, and a moving average used to calculate the bands is shown. It is to be understood that the illustration depicted in FIG. 2 is for example purposes only, and is not intended to present typical results or to limit the scope of the concepts disclosed and described herein. FIG. 2 illustrates certain characteristics of the volatility threshold bands and underlying geospatial temporal feature data that can be used by the volatility threshold analysis component 118 to automatically identify periods of interest corresponding to events of potential interest in the dataset 122. By way of an example, the volatility threshold analysis component 118 can identify one or more instances where a value of the dataset 202 corresponding to a first time lies outside the channel bounded by the respective upper and lower volatility threshold band values at the first time. In another example, the volatility threshold analysis component 118 can identify a period during which a threshold number of values of the dataset 122 were outside the channel bounded by the upper and lower volatility threshold bands 204-206. The volatility threshold analysis component 118 can also identify features of the volatility threshold bands 204-206 themselves to identify periods of interest in the dataset 202. For example, the volatility threshold analysis component 118 can be configured to identify a time or period of interest when the channel width between the upper and lower volatility threshold bands 204-206 narrows or expands by a certain amount. In another example, the volatility threshold analysis component 118 can identify periods of interest based upon a rate of change of the upper volatility threshold band 204 or the lower volatility threshold band 206.

Upon identifying a time potentially corresponding to an occurrence of an event of interest or predicting an occurrence of an event of potential interest at a future time, the volatility threshold analysis component 118 can output data indicative of the occurrence of the event or the prediction of the occurrence of the event. In one example, the data indicative of the event or prediction that is output by the volatility threshold analysis component can be a time or period of time corresponding to an occurrence of a potential event of interest. In a further example, the data output by the volatility threshold analysis component 118 can be display data that can cause the indication of the occurrence of the event or the prediction to be displayed on a display screen. By outputting an indication of the event, the prediction, or the period of interest, the system 100 can make an analyst's job more efficient by directing her attention to periods in the dataset 122 where the most interesting behavior of the features occurs. Receiving an indication of particular periods of interest can be especially useful in high-volume geospatial temporal datasets, where a dataset can span periods of months, as such datasets may be too large to be analyzed in their entirety by humans.

It is to be understood that while FIG. 1 illustrates that the geospatial sensor data 120 is received at the computing device 104 from the geospatial sensor 102, the geospatial sensor data 120 can be received from another device or system, e.g., from another computing device by way of a network connection. It is further to be understood that components in memory 108 can be distributed across multiple computing devices, and their operations executed by processors of the respective multiple computing devices. For example, a first computing device can receive the geospatial sensor data 120 and can execute the geospatial feature extraction component 112 to generate the geospatial temporal feature data 122. A second computing device can then receive the geospatial temporal feature data 122 and execute the spectral density analyzer 114, the volatility threshold computation component 116, and the volatility threshold analysis component 118 in order to output an indication of an event of interest in the geospatial temporal dataset.

Figure 3:
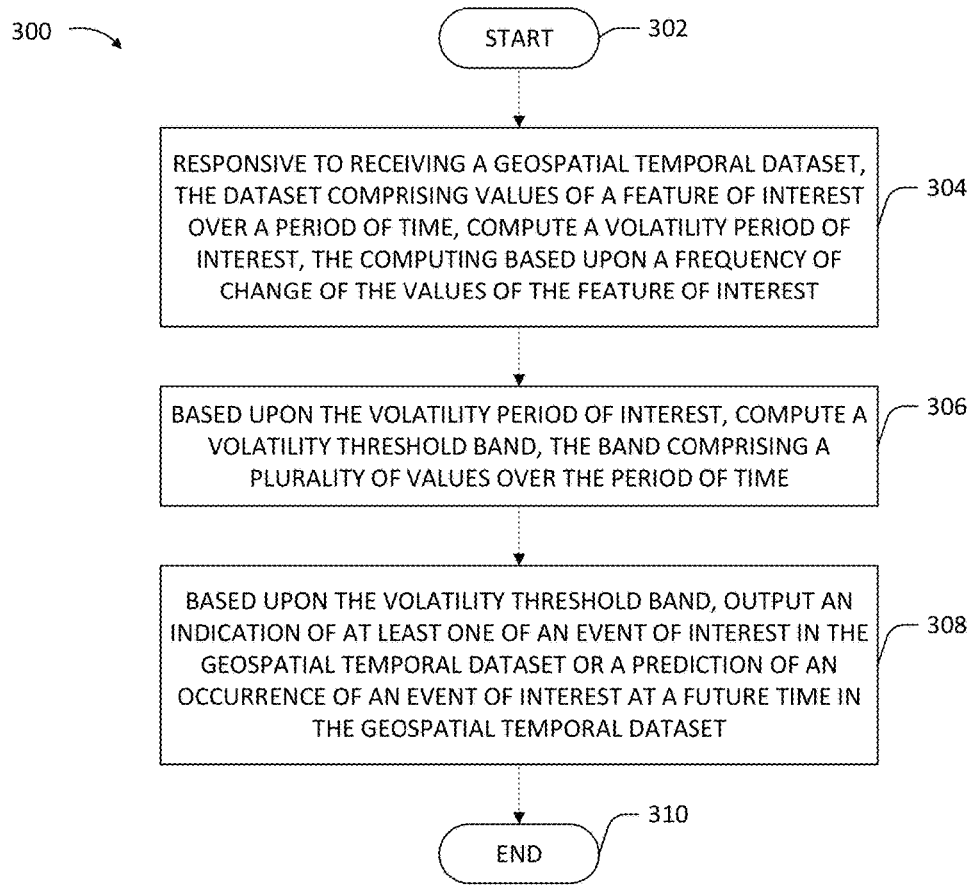
FIG. 3 is a flow diagram that illustrates an exemplary methodology for detecting, predicting, and indicating potential events of interest in geospatial temporal datasets.
Figure 4:
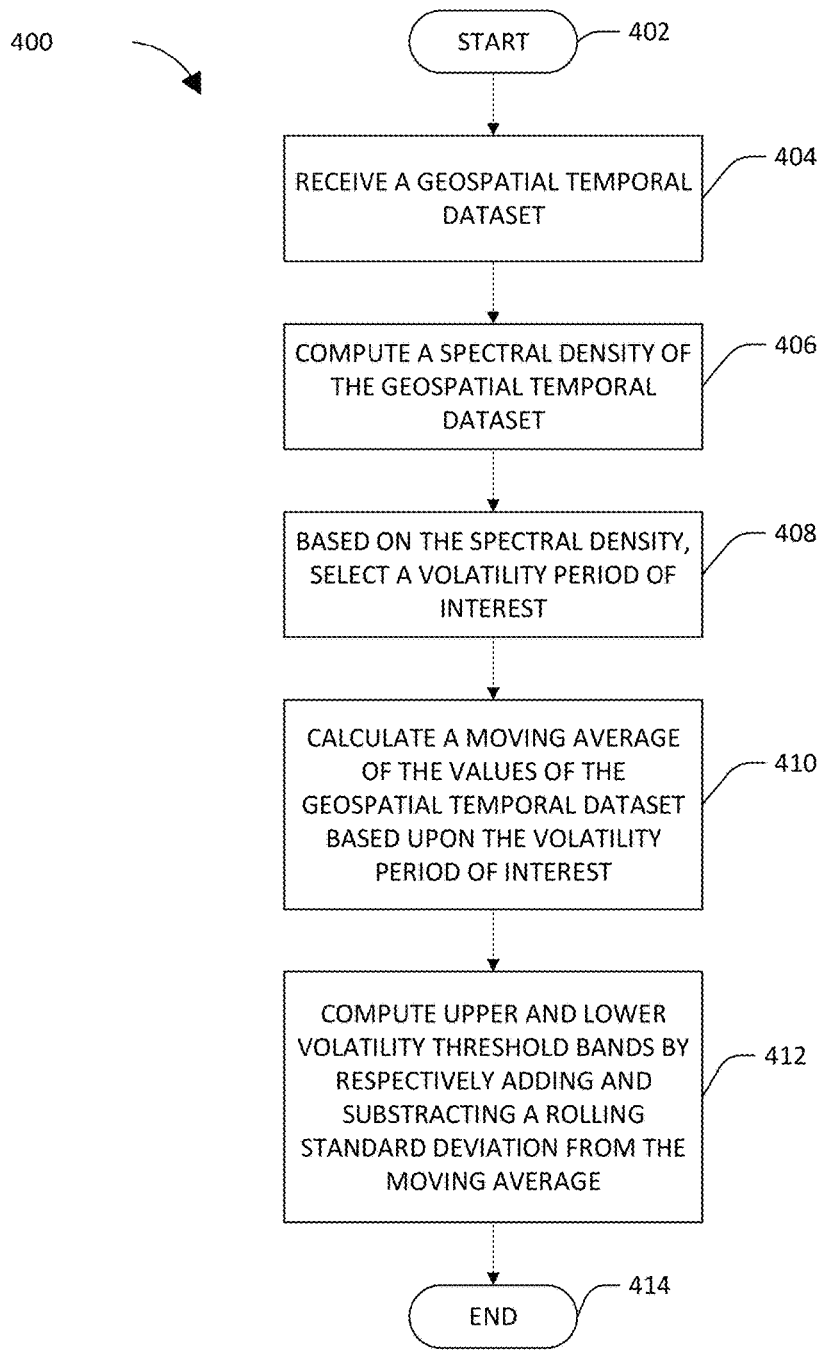
FIG. 4 is a flow diagram that illustrates an exemplary methodology for computing volatility threshold bands.

FIGS. 3-4 illustrate exemplary methodologies relating to automatic detection of relative volatility, relative amplitude, and events of interest in geospatial temporal datasets. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 that facilitates automatic detection of events, patterns, or other behaviors with respect to features of interest in high-volume geospatial temporal datasets based upon measures of relative volatility is illustrated. The methodology 300 begins at 302, and at 304 a volatility period of interest is computed responsive to receiving a geospatial temporal dataset. The geospatial temporal dataset comprises values of a feature of interest over a period of time. The computing of the volatility period of interest is based upon a frequency of change of the values of the feature of interest. The frequency can be identified based upon an analysis of a spectral density of the geospatial temporal dataset. At 306, a volatility threshold band is computed based upon the volatility period of interest computed at 304. The volatility threshold band comprises a plurality of values corresponding to times in the period of time. At 308, an indication of at least one of an event of interest in the geospatial temporal dataset or a prediction of an occurrence of an event of interest at a future time is output based upon the volatility threshold band, whereupon the methodology 300 ends at 310.

Referring now to FIG. 4, a methodology 400 that facilitates computation of the volatility threshold band is illustrated. The methodology 400 begins at 402 and at 404 a geospatial temporal dataset is received. The dataset can be received, for example, from a system that extracts features from geospatial sensor data. At 406, a spectral density of the geospatial temporal dataset is computed. In an example, the spectral density is computed by performing an FFT over the geospatial temporal data. At 408, a volatility period of interest is selected based upon the spectral density. The selection of the volatility period of interest can be based upon a relative strength of frequencies in the dataset, which can be indicated by amplitudes of peaks of the spectral density. At 410, a moving average of the values of the geospatial temporal dataset is calculated based upon the volatility period of interest. The moving average can be calculated by using the volatility period of interest as the size of a moving window of values of the geospatial temporal dataset to be averaged when computing each value of the moving average. At 412, an upper volatility threshold band is computed by adding a rolling standard deviation from the moving average, while a lower volatility threshold band is computed by subtracting the rolling standard deviation from the moving average. The methodology 400 then ends at 414.

Figure 5:
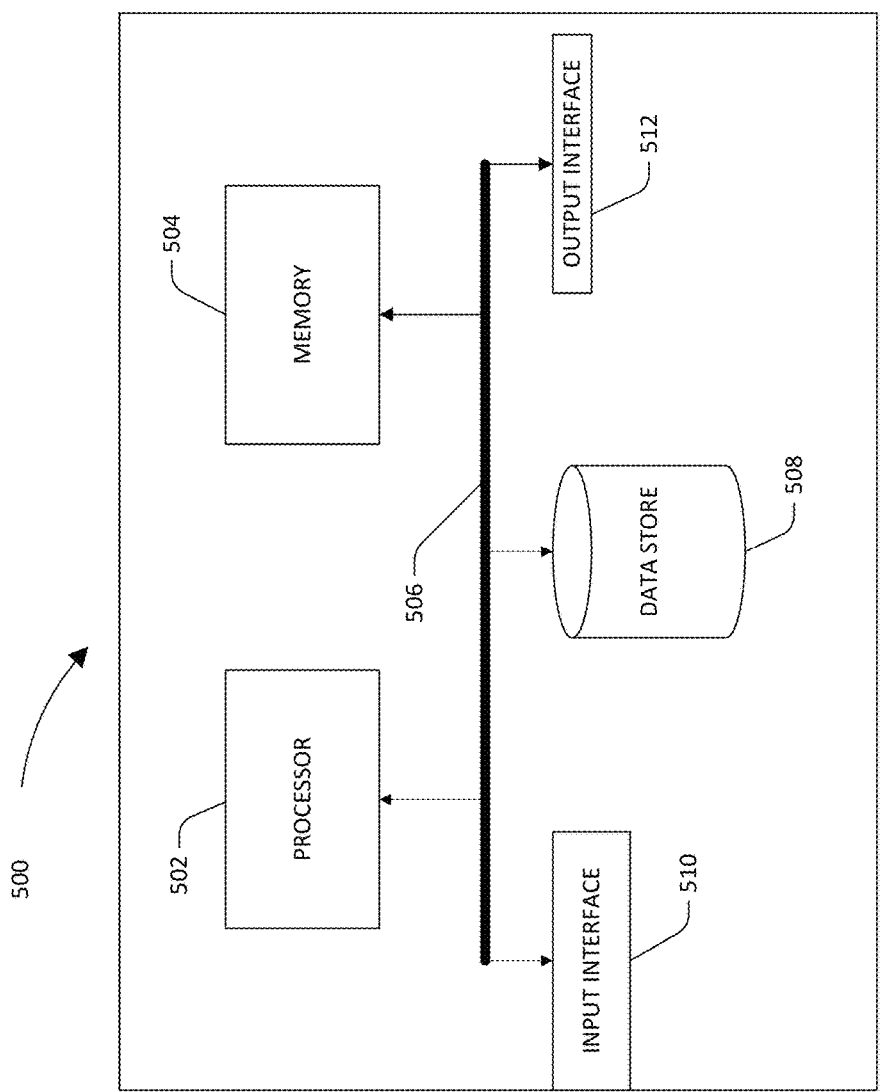
FIG. 5 is an exemplary computing system.

Referring now to FIG. 5, a high-level illustration of an exemplary computing device 500 that can be used in accordance with the systems and methodologies disclosed herein is illustrated. For instance, the computing device 500 may be used in a system that can detect relative volatility and relative amplitude of geospatial temporal datasets. By way of another example, the computing device 500 can be used in a system that provides automatic indications of occurrences of potential events of interest in high-volume geospatial temporal datasets. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store geospatial sensor data, geospatial temporal feature data, volatility threshold values, spectral density functions, etc.

The computing device 500 additionally includes a data store 508 that is accessible by the processor 502 by way of the system bus 506. The data store 508 may include executable instructions, geospatial sensor data, geospatial temporal feature data, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device, comprising:
   at least one processor;
   a display; and
   memory comprising instructions that, when executed by the at least one processor, cause the at least one processor to perform acts comprising:
   responsive to receiving a geospatial temporal dataset comprising values of a feature of interest over a period of time, the values of the feature of interest based upon data from one or more geospatial sensors, computing a spectral density of the geospatial temporal dataset;
   computing a volatility period of interest based upon the spectral density of the geospatial temporal dataset;
   computing a plurality of moving average values of the geospatial temporal dataset based upon the volatility period of interest;
   computing upper and lower volatility threshold bands based upon the moving average values, the bands comprising respective pluralities of values over the period of time;
   displaying, by way of the display and on a common set of axes, the upper volatility threshold band, the lower volatility threshold band, the moving average values, and the values of the feature of interest over the period of time, the common axes comprising a horizontal time axis and a vertical axis indicative of values pertaining to the geospatial temporal dataset; and
   based upon the upper and lower volatility threshold bands, displaying to an analyst, by way of the display, an indication of at least one of:
   an event of interest in the geospatial temporal dataset; or a prediction of an occurrence of an event of interest at a future time in the geospatial temporal dataset.

2. The computing device of claim 1, wherein computing the volatility period of interest further comprises identifying a dominant frequency of the geospatial temporal dataset based upon the spectral density, wherein the computing the volatility period of interest is based upon the dominant frequency.

3. The computing device of claim 1, wherein computing the volatility period of interest further comprises identifying a first frequency of the geospatial temporal dataset other than a dominant frequency based upon the spectral density, wherein the computing the volatility period of interest is based upon the first frequency.

4. The computing device of claim 1, wherein computing the upper and lower volatility threshold bands comprises:
   calculating the plurality of values of the upper volatility threshold band by adding a plurality of respective moving standard deviation multiple values to the respective plurality of moving average values, the plurality of respective moving standard deviation multiple values being moving standard deviation values multiplied by a multiplier; and
   calculating the plurality of values of the lower volatility threshold band by subtracting the plurality of respective moving standard deviation multiple values from the respective plurality of moving average values.

5. The computing device of claim 4, wherein the multiplier is based on a number of the values of the geospatial temporal dataset to exceed the upper volatility threshold band and a number of the values of the geospatial temporal dataset to be below the lower volatility threshold band.

6. The computing device of claim 1, the indication comprising a first time, the first time being a time at which the event of interest occurred or is predicted to occur in the geospatial temporal dataset.

7. The computing device of claim 1, wherein displaying the indication is based at least in part upon a narrowing or expansion of a channel between the upper and lower volatility threshold bands.

8. The computing device of claim 1, wherein displaying the indication is further based at least in part upon a number of the values of the feature of interest in the geospatial temporal dataset outside a channel between the upper and lower volatility threshold bands.

9. A method executed at a computing device, the method comprising:
   responsive to receiving a geospatial temporal dataset comprising values of a feature of interest over a period of time, computing a spectral density of the geospatial temporal dataset;
   computing a volatility period of interest, the computing based upon the spectral density of the geospatial temporal dataset;
   based upon the volatility period of interest, computing a plurality of moving average values of the geospatial temporal dataset;
   computing a volatility threshold band, the band comprising a plurality of values over the period of time, each of the plurality of values based upon a respective moving average value in the moving average values;
   displaying, by way of a display and on a common set of axes, the upper volatility threshold band, the lower volatility threshold band, the moving average values, and the values of the feature of interest over the period of time, the common axes comprising a horizontal time axis and a vertical axis indicative of values pertaining to the geospatial temporal dataset; and
   based upon the volatility threshold band, displaying to an analyst by way of a display an indication of at least one of:
      an event of interest in the geospatial temporal dataset; or
      a prediction of an occurrence of an event of interest at a future time in the geospatial temporal dataset.

10. The method of claim 9, wherein the volatility threshold band comprises an upper volatility threshold band, the method further comprising:
   based upon the moving average values, computing a lower volatility threshold band, the lower volatility threshold band comprising a second plurality of values over the period of time; and
   wherein further displaying the indication is based upon the upper and lower volatility threshold bands.

11. The method of claim 10, wherein displaying the indication is based upon a narrowing of a channel width, the channel width being a distance between the upper volatility threshold band and the lower volatility threshold band.

12. The method of claim 10, wherein displaying the indication is based upon a widening of a channel width, the channel width being a distance between the upper volatility threshold band and the lower volatility threshold band.

13. The method of claim 9, wherein displaying the indication is based upon a number of the values of the geospatial temporal dataset lying above the volatility threshold band.

14. The method of claim 9, wherein displaying the indication is based upon a number of the values of the geospatial temporal dataset lying below the volatility threshold band.

15. The method of claim 9, wherein computing the volatility threshold band is further based upon a rolling standard deviation of the values of the geospatial temporal dataset, the rolling standard deviation based upon the volatility period of interest.

16. A computer-readable medium comprising instructions that, when executed by a processor, cause the processor to perform acts comprising:
   responsive to receiving a geospatial temporal dataset comprising values of a feature of interest over a period of time, the values of the feature of interest based upon data from one or more geospatial sensors, computing a volatility period of interest, the computing based upon a spectral density of the geospatial temporal dataset;
   based upon the volatility period of interest, computing a moving average of the values of the feature of interest, the moving average comprising a plurality of moving average values;
   based upon the moving average and a rolling standard deviation, computing upper and lower volatility threshold bands;
   displaying, by way of a display and on a common set of axes, the upper volatility threshold band, the lower volatility threshold band, the moving average values, and the values of the feature of interest over the period of time, the common axes comprising a horizontal time axis and a vertical axis indicative of values pertaining to the geospatial temporal dataset; and
   based at least in part upon the upper and lower volatility threshold bands, displaying, on the display, an indication of a period of time corresponding to an event of interest in the geospatial temporal dataset.

* * * * *